United States Patent [19]
LaBerge et al.

[11] Patent Number: 5,740,380
[45] Date of Patent: Apr. 14, 1998

[54] METHOD AND SYSTEM FOR APPORTIONING COMPUTER BUS BANDWIDTH

[75] Inventors: Paul A. LaBerge, Shoreview; Joe Jeddeloh, Minneapolis; A. Kent Porterfield, New Brighton, all of Minn.

[73] Assignee: Micron Electronics, Inc., Nampa, Id.

[21] Appl. No.: 680,464

[22] Filed: Jul. 15, 1996

[51] Int. Cl.$^6$ .................................................. G06F 13/00
[52] U.S. Cl. ........................... 395/287; 395/297; 395/856
[58] Field of Search ......................... 395/287, 296, 395/298, 303, 305, 856, 861, 297, 302

[56] References Cited

U.S. PATENT DOCUMENTS

| | | | |
|---|---|---|---|
| 4,953,081 | 8/1990 | Feal et al. | 395/291 |
| 4,959,775 | 9/1990 | Yonekura | 395/295 |
| 5,179,667 | 1/1993 | Iyer | 395/494 |
| 5,533,205 | 7/1996 | Blackledge, Jr. et al. | 395/287 |

OTHER PUBLICATIONS

M. Morris Mano, Computer System Architecture (Second Edition), Prentice–Hall, Inc.1982 pp. 406–415 and pp. 454–462.

*Primary Examiner*—Jack B. Harvey
*Assistant Examiner*—Ario Etienne
*Attorney, Agent, or Firm*—Seed and Berry LLP

[57] ABSTRACT

A method and system interfaces a plurality of bus requesters with a computer bus having a bus bandwidth. The bus bandwidth is apportioned among the plurality of bus requesters by assigning to a selected bus requester a portion of the bus bandwidth based on how much the selected bus requester used the bus during a defined period. A bus controller determines how much the selected bus requester used the bus during the fine period by monitoring the use of the bus requester during the defined period. The bus controller assigns an initial bus bandwidth portion and a target use bandwidth portion. The bus controller compares how much the selected bus requester used the bus during the defined period to the target use bandwidth portion assigned to the selected bus requester. If the selected bus requester used the bus during the defined period more than the target use bandwidth portion, then the bus controller assigns to the selected bus requester a new bandwidth portion that is greater than the initial bus bandwidth portion. If the selected bus requester used the bus during the defined period less than the target use bandwidth portion, then the bus controller assigns to the selected bus requester, a new bus bandwidth portion that is less than the initial bus bandwidth portion.

15 Claims, 4 Drawing Sheets

METHOD AND SYSTEM FOR APPORTIONING COMPUTER BUS BANDWIDTH

TECHNICAL FIELD

The present invention relates to computer bus control, and more particularly, to apportioning computer bus bandwidth among a plurality of bus requesters.

BACKGROUND OF THE INVENTION

A computer system includes a set of interconnected components or modules of three basic types: central processing unit (CPU), memory, and input/output (I/O). The modules of the computer system are connected together by communication pathways known as busses. A bus is a shared transmission medium in that plural computer modules can transmit across the same bus. However, if two modules transmit during the same time period, their signals will overlap and become garbled. Therefore, it is important to ensure that only one module transmits across the bus during a given time period.

The process of allocating time or bandwidth on a computer bus among plural bus requesters is known as arbitration. Typically, an arbiter grants access for a predetermined time period or bandwidth window to whichever bus requester first requests use of the bus. If plural bus requesters have requests for use of the bus pending, then the arbiter typically employs a rotational priority or round-robin scheme to share the bus among the bus requesters. In a rotational priority scheme, the use of the bus is given for one bandwidth window to each bus requester in sequential order. After the last bus requester uses the bus, then the use of the bus is given back to the first bus requester and the rotational sequence continues.

In many computer systems, such as the Intel P6 computer system, the bus requesters can be either standard bus requesters or priority bus requesters. As the name suggests, bus requests from the priority bus requesters have preference over any new bus requests from the standard bus requesters. In the Intel P6 computer system, from one to four P6 processors are coupled to a processor bus with each P6 processor being a standard bus requester. In addition, one or more bus controllers couple memory and input/output (I/O) devices to the processor bus with each bus controller being a priority requester. The P6 processors are referred to as symmetric bus requesters because they are arbitrated on a strict rotational priority scheme.

Prior art computer systems that include standard and priority bus requesters typically employ some system for ensuring that the priority bus requesters do not completely block the standard bus requesters from using the bus. Such prior art systems assign a predetermined amount of bus bandwidth to the lower priority standard bus requesters. A problem with such a scheme is that the predetermined amount of bus bandwidth is assigned to the lower priority bus requesters regardless of whether they actually need such bus bandwidth. For example, many applications require extensive processor interaction with the processor bus while some applications require much more interaction between the I/O devices and the processor bus. As such, such prior art systems typically assign a predetermined compromise value that is likely to be suboptimal for both types of applications.

SUMMARY OF THE INVENTION

The invention is directed to a method and system for interfacing a plurality of bus requesters with a computer bus having a bus bandwidth. The bus bandwidth is apportioned among the plurality of bus requesters by assigning to a selected bus requester a portion of the bus bandwidth based on how much the selected bus requester used the bus during a defined period. Bus requester usage is determined by monitoring the use of the bus requester during the defined period. Preferably, the monitoring and assigning steps are performed for each bus requester that uses the bus.

In a preferred embodiment of the invention, the selected bus requester is assigned an initial bus bandwidth portion and a target use bandwidth portion. A comparison is made between how much the selected bus requester used the bus during the defined period and the target use bandwidth portion assigned to the selected bus requester. If the selected bus requester used the bus more than the target use bandwidth portion, then the selected bus requester is assigned a new bandwidth portion that is greater than the initial bus bandwidth portion. If the selected bus requester used the bus less than the target use bandwidth portion, then the selected bus requester is assigned a new bus bandwidth portion that is less than the initial bus bandwidth portion.

DETAILED DESCRIPTION OF THE INVENTION

Figure 1:
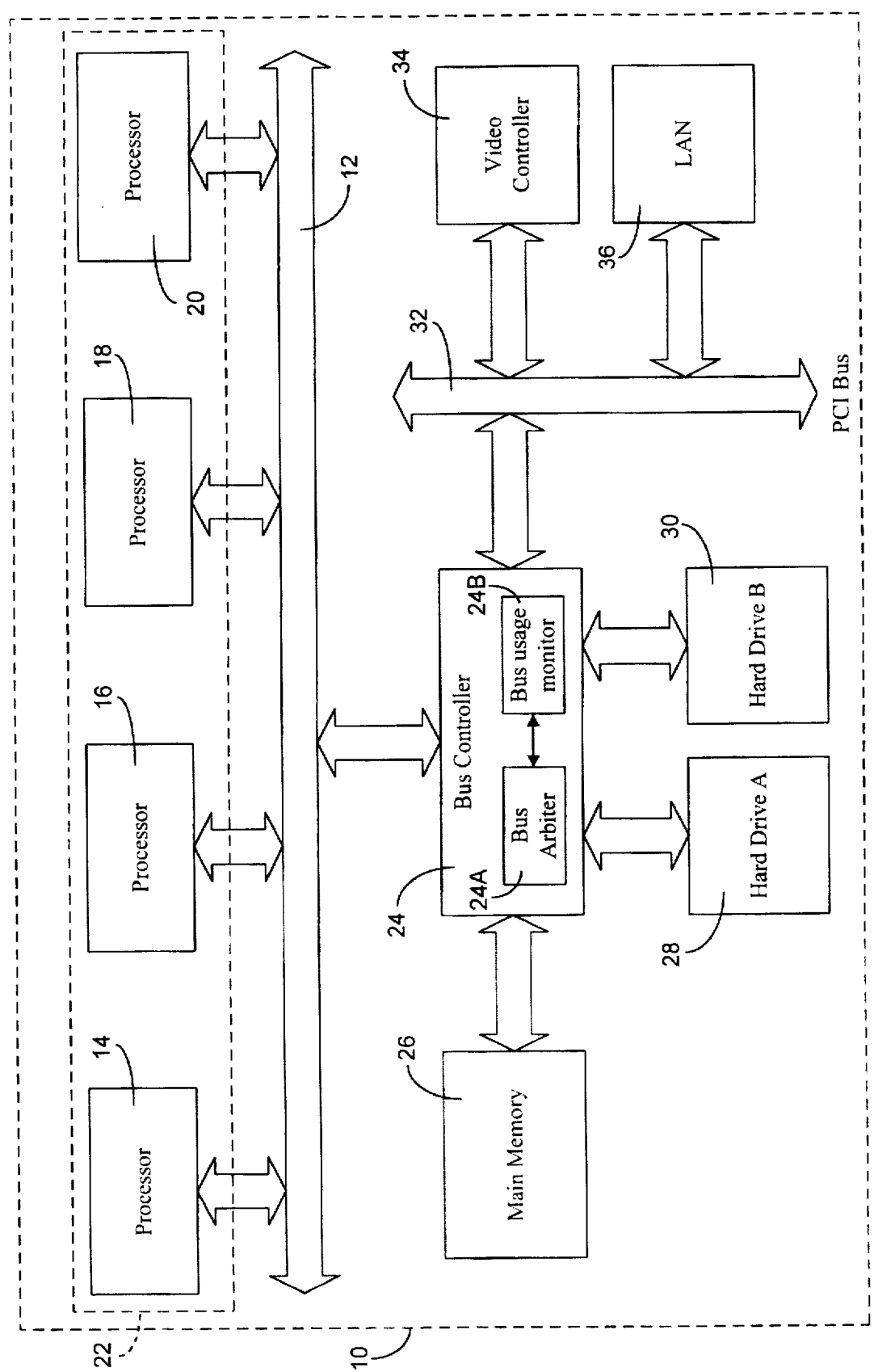
FIG. 1 is a block diagram of a computer system according to the present invention.

Shown in FIG. 1 is a computer system 10 that apportions the available bus bandwidth on a processor bus 12. The computer system 10 includes a multiprocessor system architecture in which first through fourth computer processors 14, 16, 18, 20 are each coupled to the processor bus 12. The computer processors 14–20 each request use of the processor bus 12 as necessary, and thus, are known as bus requesters. Each of the processors 14, 16, 18, 20 can be any of numerous known computer processors, such as the Intel P6 processor. It will be appreciated that the invention also is applicable to computer systems employing more or fewer processors. In the Intel P6 computer environment, the processors 14–20 act together to arbitrate access to the processor bus 12, and thus, the processors 14–20 act as a symmetric group requester 22.

The computer system 10 also includes a bus controller 24 that controls access to the processor bus 12 by a plurality of bus requesters 26, 28, 30, 32. Each bus requester is a computer system element or module that requests use of the processor bus 12. As shown in FIG. 1, the bus requesters include a main memory 26, a hard drive A 28, a hard drive B 30 and a Peripheral Component Interconnect (PCI) bus 32. The PCI bus 32 is shared by two subrequesters: a video controller 34 and a local area network (LAN) 36. It will be appreciated that the particular modules shown as bus requesters 26–32 and subrequesters 34–36 are exemplary only and numerous other types and numbers of bus requesters could be employed without departing from the invention. In addition, the processor bus 12, the PCI bus 32, or any other computer system bus may be similarly apportioned.

The bus requesters 26–32 request access to the processor bus 12 via the bus controller 24, and thus, the bus controller 24 effectively acts as a bus requester for the bus requesters 26–32. The bus controller 24 includes a bus arbiter 24A that arbitrates between the bus requesters 26–32 for access to the processor bus 12. The bus controller 24 also includes a bus usage monitor 24B that monitors how much the processor bus 12 is used by one or more of the bus requesters 14–22, 26–32.

In the Intel P6 computer environment, the processor bus requesters 14–20 are known as symmetric bus requesters and the bus requesters 24–30 are known as priority bus requesters. The symmetric bus requesters 14–20 arbitrate with each other for the bus based on a strict round-robin rotating priority scheme. Each of these symmetric bus requesters is assigned a different requester identification code from 0 to 3. Symmetric bus requester 0 has the highest priority followed by symmetric bus requesters 1, 2, and 3. Each symmetric bus requester also maintains a common rotating identification number that reflects the bus requester identification code of the symmetric bus requester that most recently used the bus. Whichever symmetric bus requester has a symmetric identification code that immediately follows the rotating identification number (0 follows 3) is given priority to use the processor bus 12 over the remaining symmetric bus requesters.

In the Intel P6 computer environment, each of the priority requesters 26–32 has priority over the symmetric bus requesters 14–20. When any of the priority requesters 26–32 request the bus controller 24 for use of the processor bus 12, the bus controller transmits a priority bus request signal (BPRI# in Intel P6 language) across the processor bus 12. The priority bus request signal BPRI# prevents the symmetric bus requesters 14–20 from transmitting a new bus transaction. If one of the symmetric bus requesters 14–20 is currently transmitting a transaction across the processor bus 12 when the bus priority request signal is transmitted by the bus controller 24, then the symmetric bus requester completes the transaction and then relinquishes control of the processor bus to the bus controller 24.

To ensure that the processor bus 12 doesn't become saturated solely with priority requests from the bus controller 24 to the exclusion of any symmetric bus requests from the symmetric bus requesters 14–20, an initial bus bandwidth portion is assigned to the symmetric group requester 22 representing the symmetric bus requesters 14–20. In addition, the symmetric group requester 22 is assigned a target use percentage of the initial bus bandwidth portion assigned to the symmetric group. The bus usage monitor of the bus controller 24 monitors how much the symmetric group requester 22 uses the bus within a defined period. At the end of the defined period, the bus controller 24 compares how much the symmetric group requester 22 used the bus during the defined period to the target use percentage assigned to the symmetric group. If the symmetric group requester 22 used the processor bus 12 during the defined period more than the target use percentage, then the bus controller 24 assigns a new bus bandwidth portion to the symmetric group requester 22 that is greater than the initial bus bandwidth portion assigned to the symmetric group requester 22. If the symmetric group requester 22 used the bus during the defined period less than the target use percentage, then the bus controller 24 assigns a new bus bandwidth portion that is less than the initial bus bandwidth portion assigned to the symmetric group requester 22. If the symmetric group requester 22 used the processor bus 12 during the defined period an amount equal to the target use percentage, then the bus bandwidth portion assigned to the symmetric group requester 22 is not changed.

It should be appreciated that the target use percentage can include a range of percentage values such that the assigned bus bandwidth portion is changed unless the amount of bus bandwidth used by the symmetric group requester 22 during the defined period is within the range of percentage values. For example, assume that the bus controller 24 assigns to the symmetric group requester 22 an initial bus bandwidth portion of 100 megabytes per second (MBps). In addition, assume the bus controller 24 assigns to the symmetric group requester 22 a target use percentage of 75%–85%. If the symmetric group requester 22 uses the processor bus 12 more than an average of 85 MBps (0.85×100 MBps) for the defined period, then the bus controller 24 will assign the symmetric group requester 22 a new bus bandwidth portion that is greater than the 100 MBps initial bus bandwidth portion assigned to the symmetric group requester 22. If the symmetric group requester 22 used the processor bus 12 less than an average of 75 MBps (0.75×100 MBps) for the defined period, then the bus controller 24 will assign the symmetric group requester 22 a new bus bandwidth portion that is less than the 100 MBps initial bus bandwidth portion assigned to the symmetric group requester 22.

Figure 2:
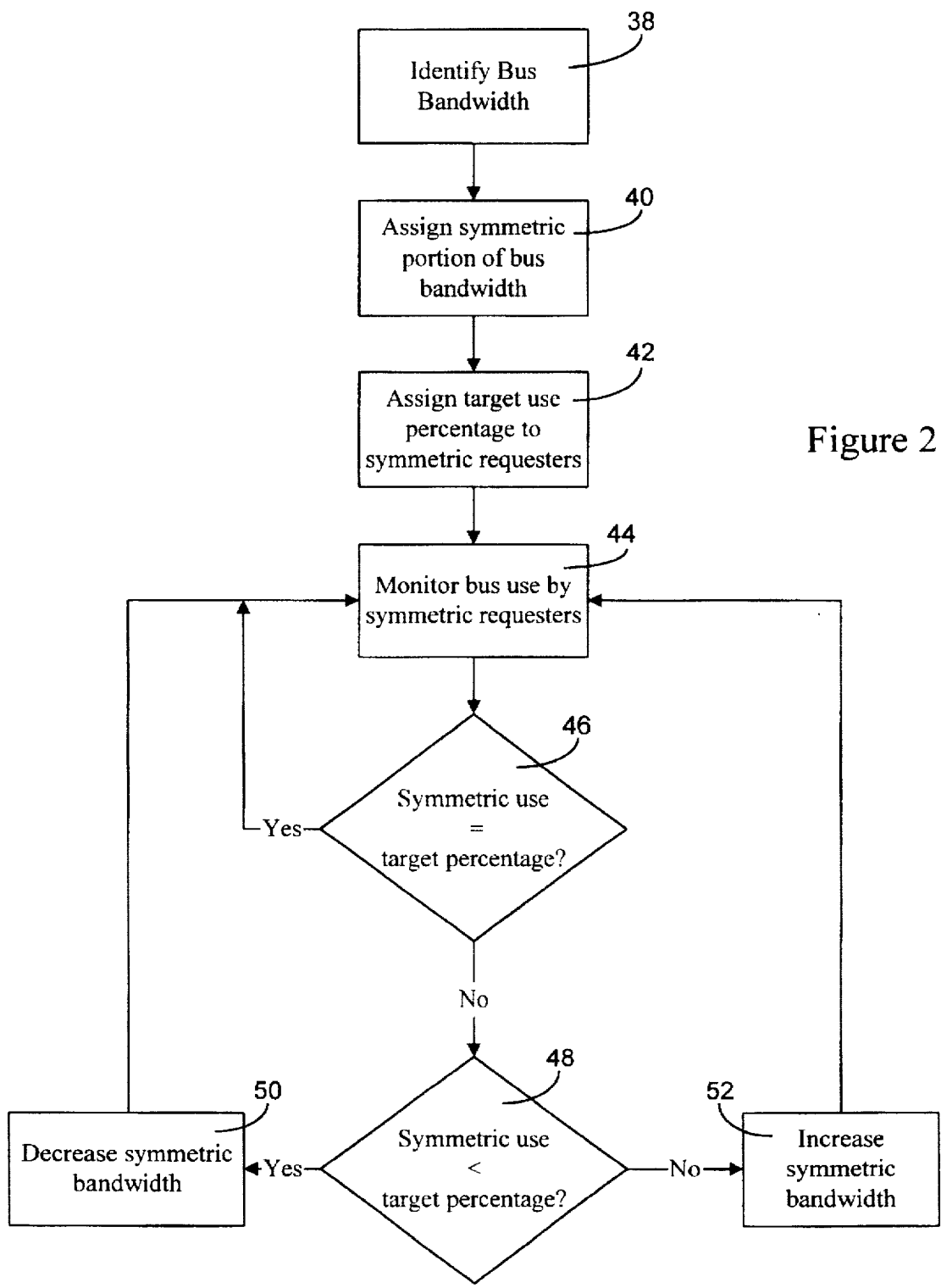
FIG. 2 is a flow diagram of a method of apportioning computer bus bandwidth according to the present invention.

A flow diagram of a first embodiment of the present invention is shown in FIG. 2. The steps shown in FIG. 2 typically are performed using software, but equivalent hardware could also be employed. In step 38, the bandwidth of the processor bus 12 is identified. Typically, the bus bandwidth is identified by a basic input/output system (BIOS) of one of the computer processors 14–20 while the computer system 12 initializes itself or "boots up" after it is turned on. The bus bandwidth depends on the number of lines or electrical connectors that constitute the processor bus 12 as well as the clock speed of the processor bus 12.

In step 40, the bus controller 24 assigns an initial bandwidth portion of the bandwidth of the processor bus 12 to the symmetric group requester 22. Typically, the bus controller 24 will perform step 40 by assigning a predetermined number of clock cycles to the symmetric group requester 22 for a defined time period. The number of clock cycles per second multiplied by the number of lines available in the processor bus 12 equals the bandwidth of the processor bus. As a result, assigning a predetermined number of clock cycles to the symmetric group requester 22 effectively assigns a predetermined bandwidth portion to the symmetric group. Alternatively, the initial bandwidth portion assigned to the symmetric group requester 22 can be a percentage value for a variable time period. For example, the bus controller 24 can assign to the symmetric group requester 25% of the total transactions transmitted on the processor bus 12 until the processor bus becomes saturated at some variable time.

In step 42, the bus controller 24 assigns a target use percentage to the symmetric group requester 22 of symmetric bus requesters 14–20. As discussed above, the target use percentage can be a single value or a range of percentage values. Thus, the target use percentage corresponds to a bus bandwidth portion or a range of bus bandwidth portions.

In step 44, the bus controller 24 monitors the use of the processor bus 12 by the symmetric group requester 22 representing the symmetric bus requesters 14–20. Preferably, the bus controller 24 monitors the use of the bus by determining how many times the symmetric bus requesters 14–20 in the symmetric group requester 22 transmit an address strobe (ADS# in Intel P6 language) across the processor bus 12 during the defined period. Such an address strobe is transmitted each time one of the symmetric bus requesters 14–20 transmits a transaction (e.g., a read or write request) across the processor bus 12.

In step 46, the bus controller 24 determines whether the symmetric bus requesters 14–20 of the symmetric group requester 22 have used the processor bus 12 in an amount that is equal to the target percentage assigned to the symmetric group requester 22. If so, then the bus controller 24 simply continues to monitor the bus use by the symmetric requesters in step 44 without changing the bus bandwidth portion assigned to the symmetric group requester 22. If not, then in step 48 the bus controller 24 determines whether the symmetric group requester 22 has used the processor bus 12 less than the amount corresponding to the target percentage assigned to the symmetric group requester 22. If the symmetric group requester 22 has used the processor bus less than the target percentage, then in step 50 the bus controller 24 decreases the bus bandwidth portion assigned to the symmetric group requester 22. If the symmetric group requester 22 has used the processor bus 12 more than the amount corresponding to the target percentage, then in step 52 the bus controller 24 increases the bus bandwidth portion assigned to the symmetric group requester 22.

Figure 3:
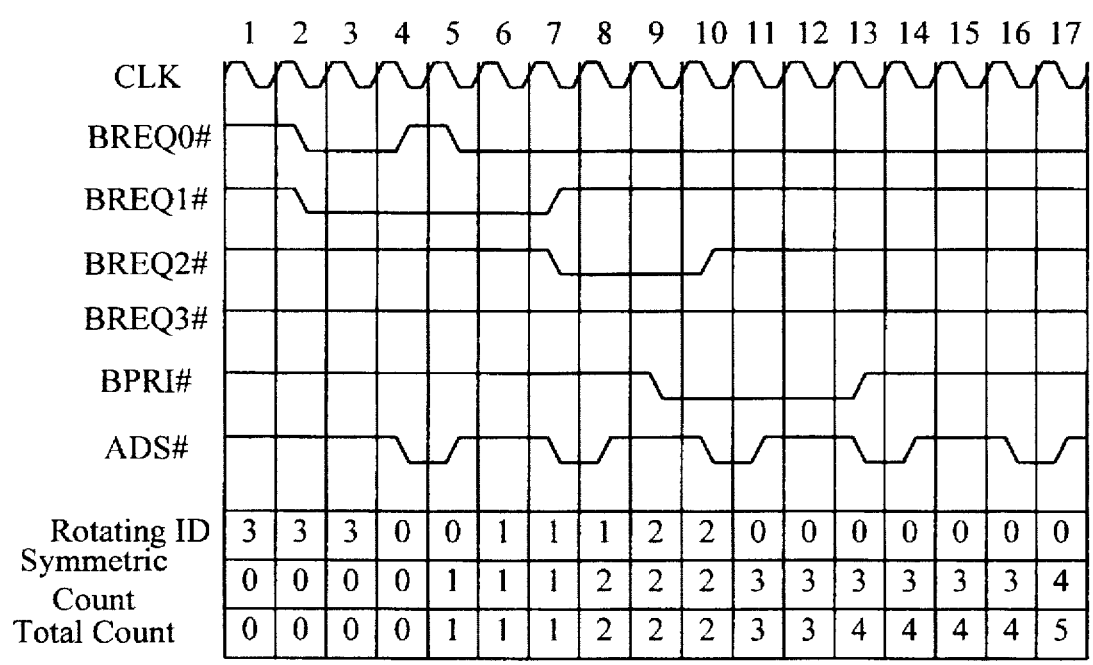
FIG. 3 is a timing diagram illustrating how the use of the computer bus is monitored according to the method shown in FIG. 2.

Shown in FIG. 3 is a timing diagram representing how the bus controller 24 monitors the use of the processor bus 12 by the symmetric group requester 22 (step 44). The symmetric bus requesters 14–20 of the symmetric group requester 22 are each assigned an identification code from 0–3. The monitoring process begins with clock (CLK) cycle 1 at which point the rotating identification code is 3. Such a rotating identification code of 3 indicates that the next symmetric bus requester to be awarded priority is symmetric bus requester 0. At clock cycle 2, symmetric bus requesters 0 and 1 transmit bus request signals BREQ0# and BREQ1#, respectively (low levels are active in FIG. 3). Because the rotating identification code currently is number 3, the symmetric bus requester 0 is permitted to issue a transaction and an accompanying address strobe ADS# across the processor bus 12. The symmetric bus requester 0 also releases its bus request signal BREQ0# to indicate that no more transactions are ready to be transmitted across the processor bus 12 by the symmetric bus requester 0. Each of the symmetric bus requesters update the rotating ID count to 0 to indicate that the symmetric bus requester 0 transmitted the most recent transaction across the processor bus 12. In clock cycle 5, the bus controller 24 notices that one of the symmetric bus requesters just transmitted the address strobe ADS# across the processor bus 12 and, in response, updates a total count and a symmetric count each to 1 which indicates that one transaction has been transmitted by one of the symmetric bus requesters.

The process continues at bus cycle 7 during which the symmetric bus requester 1 transmits the address strobe ADS# and de-activates its bus request signal BREQ1#. In clock cycle 8, the bus controller 24 updates the total count and the symmetric count each to 2 which indicates that a second transaction was transmitted by one of the symmetric bus requesters. In clock cycle 9, the bus controller 24 issues a priority bus request signal (BPRI#) which indicates that one of the priority bus requesters 26–32 has requested access to the processor bus 12. However, access to the processor bus 12 was already given to the symmetric requester 2 in response to the bus request signal BREQ2# previously transmitted by the symmetric bus requester 2 in clock cycle 7. As such, in clock cycle 10 the symmetric bus requester 2 transmits the address strobe ADS# along with a transaction across the processor bus. In clock cycle 11, the bus controller 24 updates the total count and the symmetric count each to 3 to indicate that a third transaction was transmitted by one of the symmetric bus requesters. In clock cycle 13, the bus controller 24 transmits the address strobe ADS# and a transaction across the processor bus 12 from the requesting priority bus requester. In addition, the bus controller 24 updates the total transaction count to 4, but does not change the symmetric transaction count from its previous value of 3 because the transaction transmitted was a priority transaction rather than a symmetric transaction. Simultaneously with the transmission of the address strobe ADS#, the bus controller releases the priority bus request signal BPRI#, thereby releasing control of the processor bus 12 to the symmetric requesters 14–20. In clock cycle 16, the symmetric requester 0 transmits the address strobe ADS# along with a transaction across the processor bus 12. In clock cycle 17, the bus controller 24 updates the symmetric count to 4 and the total count to 5. As of clock cycle 17, the symmetric bus requesters 14–20 have used 80% (4/5) of the processor bus bandwidth. If the defined period for monitoring the use of the processor bus were 17 cycles, then the 80% usage figure would be compared to the target use percentage by the bus controller 24 to determine whether more or less bandwidth should be assigned to the symmetric group requester 22 of symmetric bus requesters 14–20. It will be appreciated that the defined period for monitoring should be much greater than 17 cycles in order to get a representative sample of the use of the processor bus 12.

The bus bandwidth portion assigned to the symmetric group requester 22 is important when the processor bus 12 saturates with transactions from the priority requesters 26–32 via the bus controller 24. If the processor bus 12 does not saturate with transactions from the priority requesters 26–32, then the processor bus will have sufficient bandwidth to handle the transactions from the symmetric group 22 without interrupting the transactions from the priority requests. When the processor 12 saturates, the bus controller 24 preferably de-activates the bus priority request signal BPRI# after a predetermined number of consecutive clock cycles if there is a bus request waiting from one of the symmetric bus requesters 14–20. Alternatively, the bus controller 24 could deactivate the BPRI# signal when the use of the processor bus 12 by the symmetric group 22 falls below a predetermined percentage of the total use of the processor bus. De-activating the bus priority request signal BPRI# enables the symmetric group requester 22 of symmetric bus requesters 14–20 to transmit transactions across the processor bus 12 for a time period sufficient to ensure that the symmetric group can use its assigned bus bandwidth. If the symmetric group requester 22 is unable to completely use its assigned bus bandwidth portion, then control of the processor bus 12 returns to the priority requesters 26–32 via the bus controller 24.

The bus controller 24 can implement the steps (50, 52) of decreasing and increasing the bus bandwidth assigned to the symmetric group requester 22 in either of two ways. First, the bus controller 24 can de-activate the priority request signal BPRI# more often to increase the bus bandwidth portion assigned to the symmetric group requester 22 or deactivate the BPRI# signal less often to decrease the assigned symmetric bandwidth portion. For example, the bus controller 24 may de-activate the BPRI# signal after every 200 consecutive clock cycles to ensure that the symmetric group requester 22 is given access to the processor bus 12 for the assigned bus bandwidth portion. The bus bandwidth portion can be increased by de-activating the BPRI# signal after every 150 consecutive clock cycles. Second, the bus controller 24 can increase the bus bandwidth portion assigned to the symmetric group requester 22 by de-activating the BPRI# signal for a longer time period. As a result, the symmetric group requester can transmit more consecutive transactions during the time period in which the BPRI# signal is de-activated.

Figure 4:
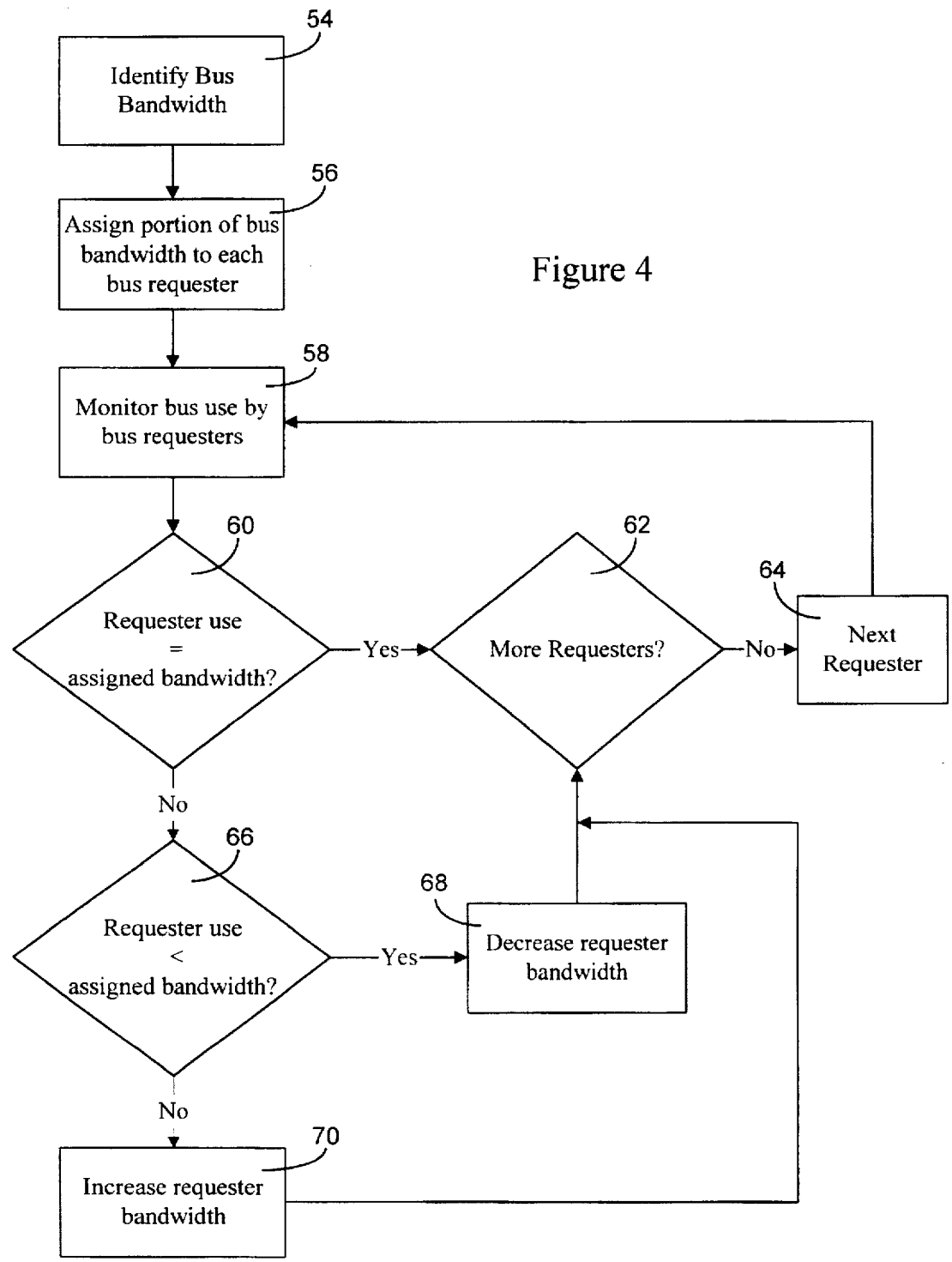
FIG. 4 is a flow diagram of an alternate method of apportioning computer bus bandwidth according to the present invention.

A flow diagram of a second embodiment of the present invention is shown in FIG. 4. In step 54, the bandwidth of the processor bus 12 is identified as discussed above with respect to step 38 of FIG. 2. In step 56, the bus controller 24 assigns an initial bandwidth portion of the bandwidth of the processor bus 12 to the symmetric group requester 22 and to each of the bus requesters 26–32. Preferably step 56 is performed similar to the manner in which step 40 of FIG. 2 is performed except that the bus bandwidth portions are assigned to each priority bus requester 26–32 in addition to the symmetric group requester 22.

In step 58, the bus controller 24 monitors the use of the processor bus 12 by the symmetric group requester 22 and by each of the priority bus requesters 26–32. The bus controller 24 stores a usage table that keeps track of how much each bus requester 22, 26–32 uses the processor bus. The use of the processor bus 12 by the symmetric group requester 22 is monitored as discussed above with respect to step 44 of FIG. 2 and FIG. 3. Monitoring the use of the processor bus 12 by the priority bus requesters 26–32 is a relatively simple matter because all such use is accomplished via the bus controller 24. That is, when any of the priority bus requesters 26–32 desire to use the processor bus 12, the priority bus requester transmits a bus request signal to the bus controller 24. Unless another priority bus requester is already using the bus, the bus controller 24 transmits a bus grant signal to the requesting priority bus requester which indicates that the priority bus requester can transmit a transaction across the processor bus 12. In addition, the bus controller 24 transmits the priority bus request signal BPRI# across the processor bus 12 which prevents the symmetric group requester 22 from transmitting new transactions across the processor bus. Next, the bus controller 24 transmits the address strobe ADS# across the processor bus 12 along with the transaction received from the requesting priority bus requester. The bus controller 24 updates a transaction count in the usage table for the priority bus requester that sent the transaction. Such a transaction count is maintained in the usage table for the symmetric group requester 22 and each of the priority bus requesters 26–32.

At some point, the bus controller 24 performs steps 60–70 to readjust the assigned bandwidth portion of the symmetric group 22 and each of the priority bus requesters 26–32 based on their past use of the processor bus 12. The point at which the readjustment occurs can be at predetermined time intervals, such as after every 1,000 clock cycles. Alternatively, the readjustment can occur in response to predetermined events, such as the detection that the processor bus 12 has become saturated.

In step 60 the bus controller 24 determines whether a first one of the bus requesters 22, 26 or 32 has used the processor bus 12 during the defined period in an amount equal to the assigned bus bandwidth portion for that bus requester. Such a determination can be made by comparing actual bandwidth values or by comparing relative values. That is, the bus controller 24 can compute a usage percentage for the first bus requester by dividing the transaction count for the first bus requester during the defined period by the total number of transactions transmitted by all of the bus requesters during the defined period. If the assigned bandwidth portion for the first bus requester is represented as a percentage of the total bus bandwidth, then the usage percentage computed can be compared to the assigned bandwidth portion in step 60.

If the first bus requester used the processor bus 12 in an amount equal to the assigned bandwidth portion for that bus requester, then in step 62 the bus controller 24 determines whether there are any more bus requesters waiting to have their assigned bandwidth portions readjusted. If there are no more bus requesters, then the bus controller 24 returns to step 58 to monitor the use of the processor bus 12 by the bus requesters. If there are more bus requesters waiting, then the bus controller 24 obtains the bus usage data for the next requester in step 64 and then returns to step 60.

If the bus controller 24 determines in step 60 that the bus requester being analyzed did not use the processor bus 12 in the same amount as its assigned bandwidth then in step 66 the bus controller determines whether the bus requester used the processor bus less than its assigned bandwidth. If so, then the bus controller 68 decreases the bandwidth portion assigned to that bus requester. If not, then the bus controller 24 increases the bandwidth portion assigned to that bus requester. After performing either step 68 or step 70, the bus controller determines in step 62 whether there are more requesters waiting to have their bandwidth portions readjusted and, if so, steps 60–70 are repeated for the next bus requester.

When the processor bus 12 becomes saturated, the bus controller 24 uses the assigned bus bandwidth portions to arbitrate the use of the processor bus 12. For example, if the bus controller assigns a bus bandwidth portion of 20% to each of the symmetric group requester 22 and priority bus requesters 26–32, then the bus controller grants access to the processor bus 12 the same number of times for each bus requester when the processor bus is saturated. Such arbitration can be implemented in many ways known in the art. For example, the bus controller 24 can employ a strict rotational priority to give each bus requester 22, 26–32 a single transaction at a time on the processor bus 12. Alternatively, the bus controller 24 can employ a strict rotational priority approach to the priority bus requesters 26–32 and then allow the symmetric group requester 22 to access the processor bus 12 for many transactions sufficient to satisfy the assigned bandwidth portion for the symmetric group requester 22. It should be appreciated that the bus controller 24 grants access to the processor bus 12 for each of the bus requesters 22, 26–32 according to each bus requester's assigned bus bandwidth portion only if the bus requester actually has enough transactions to utilize its entire assigned bus bandwidth portion.

Based on the foregoing discussion, it will be appreciated that the invention provides an arbitration mechanism that allocates the bandwidth of a computer bus more efficiently than prior art arbitration mechanisms. The invention apportions the bus bandwidth in a manner that ensures that each bus requester receives a bus bandwidth portion that is proportional to how much the bus requester used the bus during a defined period. In contrast to prior art arbitration mechanisms, the present invention enables higher bandwidth bus requesters to continue to operate at a relatively high bandwidth when the bus is saturated. In addition, the invention ensures that symmetric bus requesters have access to the computer bus in an amount that is proportional to how much the symmetric bus requesters have previously used the computer bus. Thus, the present invention enables the higher bandwidth bus requesters to operate substantially as designed, that is, at a faster speed than the lower bandwidth bus requesters.

It should be understood that even though numerous advantages of the present invention have been set forth in the foregoing description, the above disclosure is illustrative only. Changes may be made in detail and yet remain within the broad principles of the present invention.

We claim:

1. A computer-implemented method of interfacing a plurality of bus requesters with a computer bus having a bus bandwidth, the method comprising:

assigning to a selected one of the bus requesters an initial bus bandwidth portion;

assigning to the selected bus requester a target use percentage of the initial bus bandwidth portion assigned to the bus requester;

monitoring how much at least one of the bus requesters uses the bus within a defined period;

comparing how much the selected bus requester used the bus during the defined period to the target use percentage assigned to the selected bus requester; and apportioning the bus bandwidth among the plurality of bus requesters by assigning to the selected bus requester a portion of the bus bandwidth based on how much at least one of the bus requesters used the bus during the defined period, wherein the apportioning step assigns a new bus bandwidth portion to the selected bus requester based on how much the selected bus requester used the bus since being assigned the initial bus bandwidth portion and the apportioning step assigns the new bus bandwidth portion for the selected bus requester based on the comparing step.

2. The method of claim 1 wherein the monitoring step includes monitoring how much each of the bus requesters uses the bus within the defined period and the apportioning step includes assigning to each bus requester a portion of the bus bandwidth based on how much the bus requester used the bus during the defined period.

3. The method of claim 1 wherein the new bus bandwidth portion assigned to the selected bus requester is greater than the initial bus bandwidth portion assigned to the selected bus requester if the selected bus requester used the bus during the defined period more than an amount corresponding to the target use percentage and the new bus bandwidth portion assigned to the selected bus requester is less than the initial bus bandwidth portion assigned to the selected bus requester if the selected bus requester used the bus during the defined period less than the amount corresponding to the target use percentage.

4. The method of claim 3 wherein the target use percentage assigned to the selected bus requester includes a range of percentage values.

5. A computer-implemented method of interfacing a plurality of bus requesters with a computer bus having a bus bandwidth, the method comprising:

monitoring how much at least one of the bus requesters uses the bus within a defined period; and apportioning the bus bandwidth among the plurality of bus requesters by assigning to a selected one of the bus requesters a portion of the bus bandwidth based on how much at least one of the bus requesters used the bus during the defined period;

wherein the selected one of the bus requesters includes a group of computer modules each coupled to the bus, wherein the monitoring step monitors how much the group of computer modules as a whole uses the bus during the defined period and the apportioning step assigns a bus bandwidth portion to the group of computer modules as a whole based on the monitoring step.

6. A computer-implemented method of interfacing a plurality of bus requesters with a computer bus having a bus bandwidth, the method comprising:

monitoring how much at least one of the bus requesters uses the bus within a defined period, wherein the monitoring step includes detecting each address strobe transmitted across an address line of the bus during the defined period and, for each such address strobe, determining which bus requester transmitted the address strobe and storing an indication of how many address strobes were transmitted by each bus requester during the defined period; and apportioning the bus bandwidth among the plurality of bus requesters by assigning to a selected one of the bus requesters a portion of the bus bandwidth based on how much at least one of the bus requesters used the bus during the defined period.

7. A computer-implemented method of interfacing a plurality of bus requesters with a computer bus having a bus bandwidth, the method comprising:

monitoring how much a selected group of the plurality of bus requesters uses the bus within a defined period, wherein the monitoring step includes monitoring how much each of the bus requesters not in the selected group uses the bus within the defined period; and apportioning the bus bandwidth among the plurality of bus requesters by assigning to the selected group of bus requesters a portion of the bus bandwidth based on how much the selected group of bus requesters used the bus during the defined period, wherein the apportioning step includes assigning to each bus requester not in the selected group a portion of the bus bandwidth based on how much the bus requester used the bus during the defined period.

8. The method of claim 7, further comprising:

assigning to the selected group of bus requesters an initial bus bandwidth portion, wherein the apportioning step assigns a new bus bandwidth portion to the selected group based on how much the bus requesters in the selected group used the bus since being assigned the initial bus bandwidth portion.

9. A computer-implemented method of interfacing a plurality of bus requesters with a computer bus having a bus bandwidth, the method comprising:

monitoring how much a selected group of the plurality of bus requesters uses the bus within a defined period;

apportioning the bus bandwidth among the plurality of bus requesters by assigning to the selected group of bus requesters a portion of the bus bandwidth based on how much the selected group of bus requesters used the bus during the defined period;

assigning to the selected group a target use percentage of the initial bus bandwidth portion assigned to the selected group; and comparing how much the bus requesters in the selected group used the bus during the defined period to the target use percentage assigned to the selected group, wherein the apportioning step assigns the new bus bandwidth portion for the selected group based on the comparing step.

10. The method of claim 9 wherein the new bus bandwidth portion assigned to the selected group is greater than the initial bus bandwidth portion assigned to the selected group if the bus requesters in the selected group used the bus during the defined period more than an amount corresponding to the target use percentage and the new bus bandwidth portion assigned to the selected group is less than the initial bus bandwidth portion assigned to the selected group if the bus requesters in the selected group used the bus during the defined period less than the amount corresponding to the target use percentage.

11. The method of claim 10 wherein the target use percentage assigned to the selected group includes a range of percentage values.

12. A computer-implemented method of interfacing a plurality of bus requesters with a computer bus having a bus bandwidth, the method comprising:

monitoring how much a selected group of the plurality of bus requesters uses the bus within a defined period, wherein the monitoring step includes detecting each address strobe transmitted across an address line of the bus during the defined period and, for each such address strobe, determining which bus requester transmitted the address strobe and storing an indication of how many address strobes were transmitted by the bus requesters in the selected group during the defined period; and apportioning the bus bandwidth among the plurality of bus requesters by assigning to the selected group of bus requesters a portion of the bus bandwidth based on how much the selected group of bus requesters used the bus during the defined period.

13. A computer system for interfacing a plurality of bus requesters with a bus having a bus bandwidth, the system comprising:

a bus usage monitor structured to monitor how much at least one of the bus requesters uses the bus within a defined period; and an bus arbiter in communication with the bus usage monitor, the bus arbiter being structured to apportion the bus bandwidth among the plurality of bus requesters by assigning to at least one of the selected bus requesters a portion of the bus bandwidth based on how much at least one of the selected bus requesters used the bus during the defined period; wherein the bus arbiter is structured to assign to the selected bus requester an initial bus bandwidth portion and assign a new bus bandwidth portion to the selected bus requester based on how much the selected bus requester used the bus since being assigned the initial bus bandwidth portion and wherein the bus arbiter is structured to assign to the selected bus requester a target use percentage of the initial bus bandwidth portion assigned to the bus requester, and compare how much the selected bus requester used the bus during the defined period to the target use percentage assigned to the selected bus requester, and assign the new bus bandwidth portion for the selected bus requester based on the comparison.

14. The computer system of claim 13 wherein the bus usage monitor is structured to monitor how much each of the bus requesters uses the bus within the defined period and the bus arbiter is structured to assign to each bus requester a portion of the bus bandwidth based on how much the bus requester used the bus during the defined period.

15. A computer system for interfacing a plurality of bus requesters with a bus having a bus bandwidth, the system comprising:

a bus usage monitor structured to monitor how much at least one of the bus requesters uses the bus within a defined period; and an bus arbiter in communication with the bus usage monitor, the bus arbiter being structured to apportion the bus bandwidth among the plurality of bus requesters by assigning to at least one of the selected bus requesters a portion of the bus bandwidth based on how much at least one of the selected bus requesters used the bus during the defined period;

wherein the the at least one of the bus requesters includes a group of computer modules each coupled to the bus, wherein the bus usage monitor is structured to monitor and provide an indication of how much the group of computer modules as a whole uses the bus during the defined period and the bus arbiter is structured to assign a bus bandwidth portion to the group of computer modules as a whole based on the indication provided by the bus usage monitor.

* * * * *